US009577782B2

(12) United States Patent
Prakash et al.

(10) Patent No.: US 9,577,782 B2
(45) Date of Patent: Feb. 21, 2017

(54) SYSTEMS AND METHODS FOR STATISTICAL MULTIPLEXING WITH OTN AND DWDM

(71) Applicants: Anurag Prakash, Noida (IN); Mohit Chhillar, New Delhi (IN)

(72) Inventors: Anurag Prakash, Noida (IN); Mohit Chhillar, New Delhi (IN)

(73) Assignee: Ciena Corporation, Hanover, MD (US)

( * ) Notice: Subject to any disclaimer, the term of this patent is extended or adjusted under 35 U.S.C. 154(b) by 49 days.

(21) Appl. No.: 14/340,788

(22) Filed: Jul. 25, 2014

(65) Prior Publication Data

US 2015/0365189 A1  Dec. 17, 2015

(30) Foreign Application Priority Data

Jun. 13, 2014  (IN) .......................... 1607/DEL/2014

(51) Int. Cl.
*H04J 14/02* (2006.01)
(52) U.S. Cl.
CPC .................................. *H04J 14/0227* (2013.01)
(58) Field of Classification Search
None
See application file for complete search history.

(56) References Cited

U.S. PATENT DOCUMENTS

| 8,412,040 | B2 | 4/2013 | Valiveti et al. |
| 8,467,375 | B2 | 6/2013 | Blair |
| 8,666,247 | B2 | 3/2014 | Srinivasan et al. |
| 8,682,160 | B2 | 3/2014 | Prakash et al. |
| 8,718,471 | B2 | 5/2014 | Prakash et al. |
| 8,854,963 | B1 * | 10/2014 | Muma ..................... H04B 10/27 370/231 |
| 2008/0049760 | A1 | 2/2008 | Bergeron |
| 2012/0082455 | A1 | 4/2012 | Bardalai et al. |
| 2012/0106956 | A1 | 5/2012 | Rao et al. |

(Continued)

FOREIGN PATENT DOCUMENTS

| EP | 2434712 A1 | 3/2012 |
| EP | 2733880 A1 | 5/2014 |

OTHER PUBLICATIONS

"Architecture for the automatically switched optical network (ASON)," International Telecommunication Union, Jun. 2006, pp. 1-104.

*Primary Examiner* — Steven H Nguyen
(74) *Attorney, Agent, or Firm* — Clements Bernard Walker PLLC; Christopher L. Bernard; Lawrence A. Baratta, Jr.

(57) ABSTRACT

A method includes profiling user-network interface (UNI) ports including Optical channel Data Unit flex (ODUflex) in a network; and adapting, using a max-flow routing criterion, network-network interface (NNI) ports comprising ODUflex based on the profiling. A network includes a plurality of network elements; a plurality of links interconnecting the plurality of network elements, wherein the plurality of links includes Layer 0 Dense Wave Division Multiplexing (DWDM) bandwidth and Layer 1 Optical Transport Network (OTN) bandwidth; and a control plane operating between the plurality of network elements; wherein the Layer 0 DWDM bandwidth and the Layer 1 OTN bandwidth is statistically multiplexed using the control plane and manager based on monitoring bandwidth usage thereon over time.

19 Claims, 12 Drawing Sheets

(56) References Cited

U.S. PATENT DOCUMENTS

| | | | |
|---|---|---|---|
| 2013/0170832 A1* | 7/2013 | Tochio | H04L 12/413 |
| | | | 398/45 |
| 2013/0177305 A1 | 7/2013 | Prakash et al. | |
| 2013/0177311 A1 | 7/2013 | Trnkus et al. | |
| 2013/0259465 A1 | 10/2013 | Blair | |
| 2013/0308948 A1 | 11/2013 | Swinkels et al. | |
| 2014/0016925 A1* | 1/2014 | Ceccarelli | H04J 3/1652 |
| | | | 398/5 |
| 2014/0029426 A1* | 1/2014 | Saitoh | H04L 47/12 |
| | | | 370/235 |
| 2014/0126899 A1* | 5/2014 | Prakash | H04L 45/28 |
| | | | 398/5 |

* cited by examiner

SYSTEMS AND METHODS FOR STATISTICAL MULTIPLEXING WITH OTN AND DWDM

FIELD OF THE DISCLOSURE

The present disclosure relates generally to optical networking systems and methods. More particularly, the present disclosure relates to statistical multiplexing with Optical Transport Network (OTN) at Layer 1 and with Wave Division Multiplexing (WDM) at Layer 0.

BACKGROUND OF THE DISCLOSURE

Communication network planning involves accurate mathematical modeling of demand uncertainties. However an accurate fixed model cannot be postulated by network planning. Also the model would need to change with changing demographics and communication technologies (Wireless/Wire-line) over time. Statistical multiplexing techniques provide a useful solution to address some of the complexities in communication network planning, and are well-known with packet technologies. However, time division multiplexing technologies such as with OTN, Synchronous Optical Network (SONET), Synchronous Digital Hierarchy (SDH), and Wavelength Division Multiplexing (WDM) (Layer 0 and 1) cannot adapt to demand uncertainties and provide no opportunities for over-subscription as allowed in packet technologies with statistical multiplexing. At Layers 0 and 1, all flows are statically allocated with fixed sizes irrespective of the amount of actual capacity thereon. In order to provide packet services over OTN (POTS) or packet services over DWDM, Layers 0 and 1 need to respond to the network dynamics; thus, it would be advantageous to support statistical multiplexing with OTN at Layer 1 and WDM at Layer 0

BRIEF SUMMARY OF THE DISCLOSURE

In an exemplary embodiment, a method includes profiling user-network interface (UNI) ports including Optical channel Data Unit flex (ODUflex) in a network; and adapting, using a max-flow routing criterion, network-network interface (NNI) ports including ODUflex based on the profiling. The method can further include detecting congestion on the UNI ports and initiating a resize based thereon, wherein the detecting is based on an adaptive prediction algorithm based on peak rate variance. The method can further include resizing an ODUflex connection based on the profiling and the adapting, utilizing hitless adjustment of ODUflex (HAO). The method can further include monitoring a differential peak variance in a number of ODU0 timeslots on the UNI ports; and resizing an ODUflex connection based on the monitoring. The method can further include utilizing Weighted High Water Mark Detect profiling on the UNI port and the NNI ports to minimize congestion/contention. The method can further include selectively sampling bandwidth usage on the UNI ports and the NNI ports; and defining a plurality of statistical parameters for using the sampling to determine whether to resize ODUflex connections on the UNI ports and the NNI ports. The method can further include defining an absolute and average maximum bandwidth used on a link; and defining a connection discourage criterion to apply during path computation to decide whether to disallow a connection on the link if a requested bandwidth is greater than a threshold. The method can further include defining an absolute and average maximum bandwidth used on a link for a High Water Mark (HWM); and performing oversubscription on the link based on the absolute and average maximum bandwidth. The method can further include computing a maximum oversubscription on all links in the network; and utilizing the maximum oversubscription as a cost criterion during path computation in the network.

The method can further include selectively sampling bandwidth usage on the UNI ports and the NNI ports; defining a plurality of statistical parameters for using the sampling to determine whether to resize ODUflex connections on the UNI ports and the NNI ports; and performing one of advertising the plurality of statistical parameters through a control plane or providing the plurality of statistical parameters to a Software Defined Networking (SDN) controller. The method can further include receiving a request for additional bandwidth in the network on an ODUflex connection; allowing the request if the additional bandwidth is less than an average maximum bandwidth used on a link for a High Water Mark (HWM) or based on connection discourage criterion; and disallowing the request if the additional bandwidth is greater than an average bandwidth on the link or based on the connection discourage criterion. The method can further include oversubscribing ODUflex bandwidth in the network based on the profiling and the adapting.

In another exemplary embodiment, a network element includes at least one port providing Optical channel Data Unit flex (ODUflex) connections in a network; and a controller communicatively coupled to the at least one port, wherein the controller is configured to: profile user-network interface (UNI) ports including the ODUflex connections in the network; and adapt, using a max-flow routing criterion, network-network interface (NNI) ports including the ODUflex connections based on the profiling. The controller can be further configured to: cause a resizing an ODUflex connection based on the profiling and the adapting utilizing hitless adjustment of ODUflex (HAO). The controller can be further configured to: selectively sample bandwidth usage on the ODUflex connection on the at least one port; and communicate the sampling in a control plane. The controller can be further configured to: compute a maximum oversubscription on all links on the at least one port; and utilize the maximum oversubscription as a cost criterion during path computation. The controller can be further configured to: oversubscribe ODUflex bandwidth on the at least one port based on the profile and the adapt.

In yet another exemplary embodiments, a network includes a plurality of network elements; a plurality of links interconnecting the plurality of network elements, wherein the plurality of links include Layer 0 Dense Wave Division Multiplexing (DWDM) bandwidth and Layer 1 Optical Transport Network (OTN) bandwidth; and a control plane operating between the plurality of network elements; wherein the Layer 0 DWDM bandwidth and the Layer 1 OTN bandwidth are statistically multiplexed using the control plane, and managed based on monitoring bandwidth usage thereon over time. The Layer 1 OTN bandwidth can include Optical channel Data Unit flex (ODUflex) connections that are oversubscribed in the network based on the monitoring bandwidth. The Layer 0 DWDM bandwidth can include flex grid spectrum that is adjusted spectrally and based on baud rate based on the monitoring bandwidth.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

In various exemplary embodiments, systems and methods for statistical multiplexing with OTN at Layer 1 and WDM at Layer 0 are described. The systems and methods using Optical channel Data Unit-Flex (ODUflex) and/or flexible spectral grids (Flex Grid) to achieve over-subscription in OTN/DWDM networks both on network-network interface (NNI) as well as user-network interface (UNI) ports. The systems and methods provide practical solutions, at Layers 0 and/or 1, to demand uncertainties, over-subscription, and early congestion detection with respect to resizing/reallocation/routing functions into OTN/DWDM networks respectively (multi-layer interconnections).

Figure 1:
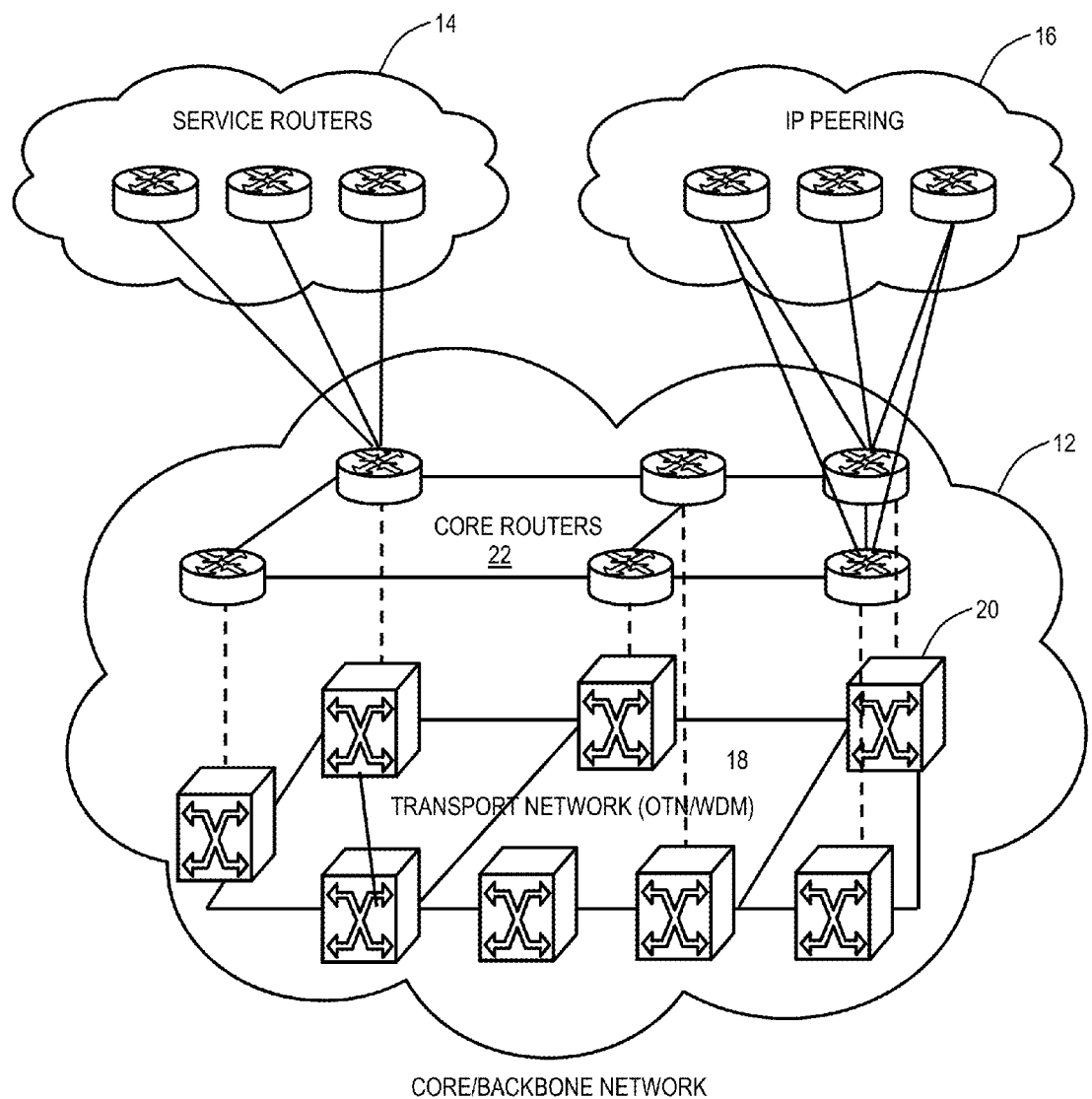
FIG. 1 is a network diagram of an exemplary multi-layer network for statistical multiplexing with OTN at Layer 1 and/or WDM at Layer 0.

Referring to FIG. 1, in an exemplary embodiment, a network diagram illustrates an exemplary multi-layer network 10 for statistical multiplexing with OTN at Layer 1 and/or WDM at Layer 0. Note, the multi-layer network 10 is shown for illustration purposes, and the systems and methods contemplate operation on any Layer 1 and/or 0 network as is described herein. The multi-layer network 10 includes a core/backbone network 12, service routers 14, and IP peering 16. The core/backbone network 12 can include a transport network 18 with a plurality of interconnected network elements 20 which can include OTN and/or WDM. The core/backbone network 12 can also include a core router network 22 which can include Layer 2/3 switches/routers. Also, Layer 2 functionality can be integrated in the transport network 18 as well through the network elements 20, e.g., Packet-Optical Transport Switches (POTS). The multi-layer network 10 is described as multi-layer in that it include optical/photonic (Layer 0), TDM such as OTN (Layer 1), Ethernet/MPLS (Layer 2), and/or IP (Layer 3). The multi-layer network 10 is dynamic at Layers 2 and 3, and the systems and methods described herein introduce dynamic flexibility at Layers 1 and 0. To avoid contention amongst the various multi-layer interconnections, traffic estimates can be conservative and use Peak rates. However traffic peaks do not occur simultaneously on for all traffic flows using the same link; thus there is an opportunity to leverage over-subscription at Layers 1 and/or 0 as well.

Figure 2:
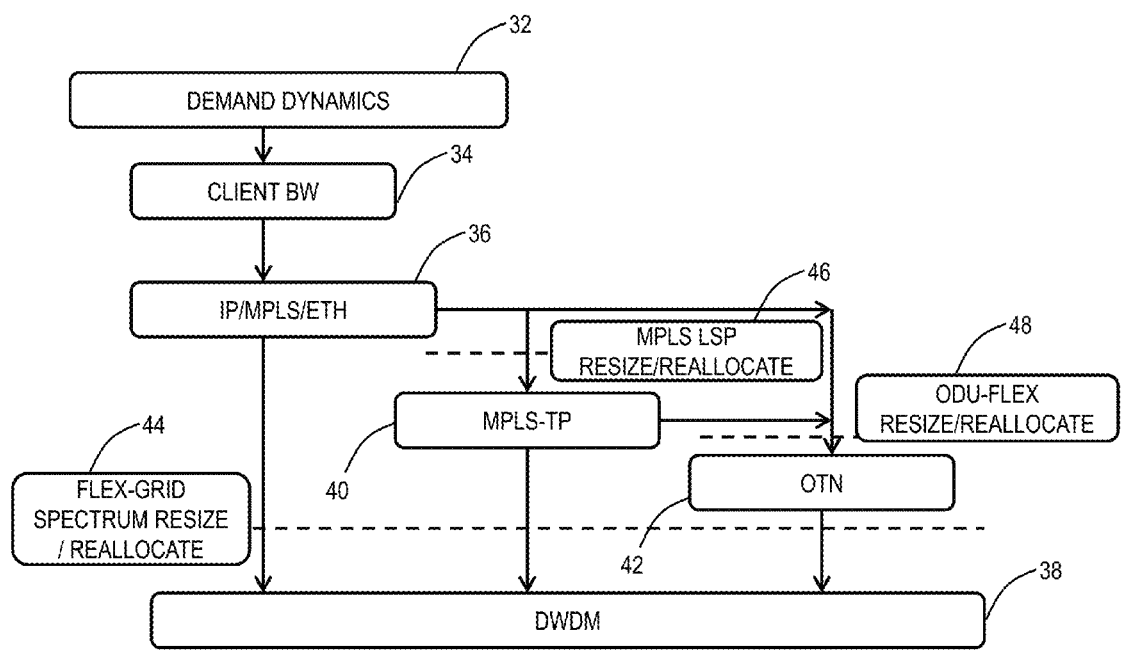
FIG. 2 is a logical diagram of interactions in the multi-layer network and associated techniques for adapting to the vagaries of demand dynamics.

Referring to FIG. 2, in an exemplary embodiment, a logical diagram illustrates interactions 30 in the multi-layer network 10 and associated techniques for adapting to the vagaries of demand dynamics 32. The demand dynamics 32 translate to customer demands 34 in the form of IP, MPLS, or Ethernet traffic 36. The IP, MPLS, or Ethernet traffic 36 can be provided in the multi-layer network 10 directly over DWDM 38, through MPLS Transport Profile (MPLS-TP) 40, and/or through OTN 42. To accommodate the demand dynamics 32, techniques have been developed supporting Flex Grid spectrum resize/reallocation 44, MPLS Label Switched Path (LSP) resize/reallocation 46, and/or ODUflex resize/reallocation 48. In the systems and methods described herein, ODUflex based G.HAO (Hitless Adjustment of ODUflex) and spectrum resizing based on Flex Grid DWDM network play a crucial role in multi-layer integration.

ODUflex Hitless Adjustment Overview

ODUflex (GFP) HAO (Hitless Adjustment of ODUflex) is a resizing mechanism within OTN that allows it to support an increase or decrease of ODUflex (GFP) client data rate across its entire end-to-end path. The following pre-conditions exist for hitless re-adjustment: I. all nodes in the connection must support the HAO protocol, otherwise, the connection requires tear down and rebuilding; II. The ODUflex is a single managed entity rather than containing separate managed entities (ODUflex CTP); III. The bit rate adjustment of the ODUflex (GFP) occurs simultaneously among all the nodes in the ODUflex (GFP) connection to prevent buffer overflow or underflow; and IV. A resizable ODUflex (GFP) occupies the same number of tributary slots on every link of the server. In cases of bandwidth adjustment (i.e., increase or decrease), the same number of tributary slots (at least one TS) on each link traversed by the resized ODUflex (GFP) must be involved. In simple terms, HAO is a replacement for Virtual Concatenation (VCAT), which involved routing bandwidth through the network along different physical paths necessitating differential delay compensation. ODUflex removes the constraint but imposes the constraint of routing of all TS (Time slots) on the same physical route.

Flex Grid DWDM Resizing Overview

Figure 3:
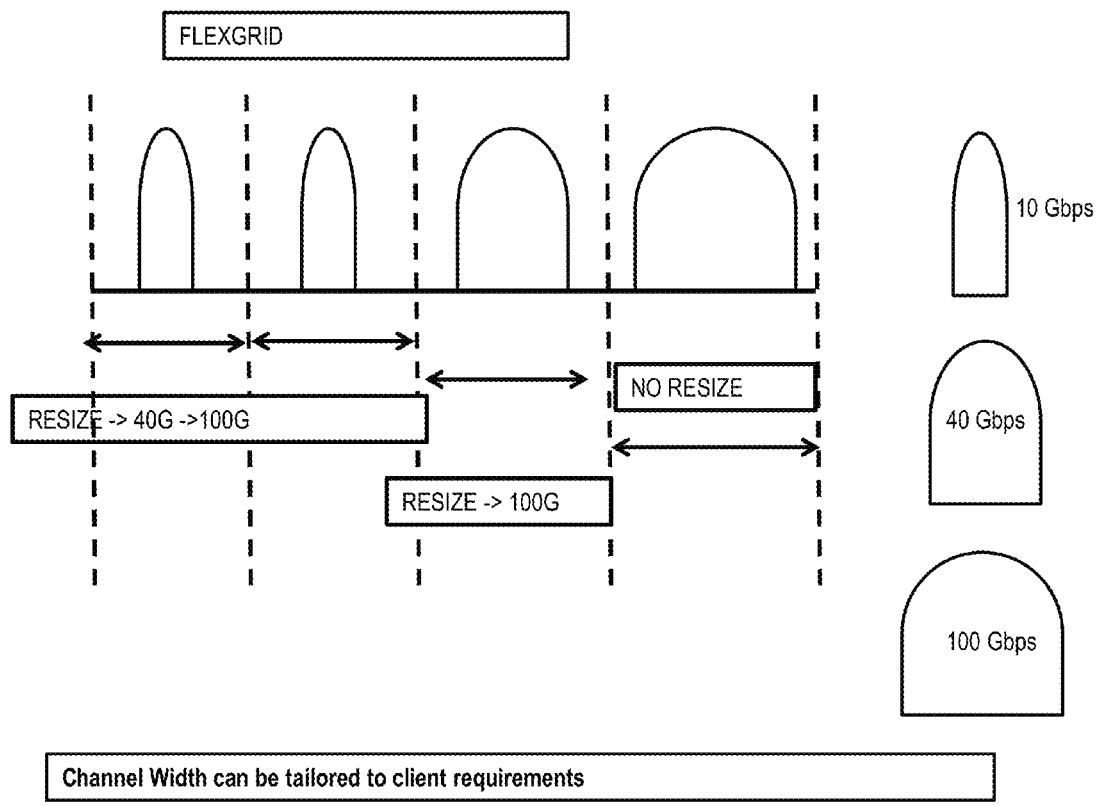
FIG. 3 is a spectral diagram of Flex Grid spectrum resizing for resizing enablers in the DWDM domain.

Referring to FIG. 3, in an exemplary embodiment, a spectral diagram illustrates Flex Grid spectrum resizing 50 for resizing enablers in the DWDM domain. Beyond fiber capacity, network design plays a crucial role to increase spectral efficiency in the multi-layer network 10. This requires building a flexible network, which will have a flexible spectrum grid and transceivers with capability to dynamically adapt to various modulation schemes. These agile networks will enable time dependent bandwidth sharing, energy efficient OPEX, enable bandwidth squeezing and provide highly survivable restoration backbone. To be able to increase spectral efficiency of the multi-layer network 10, the multi-layer network 10 needs to have bandwidth variable filters such as wavelength selective switches (WSS) along with bandwidth variable transceivers. The next generation optical networks have the hardware capabilities to do the same with adjustable optical modems. With Flex Grid, the allocated spectrum can be resized if the adjacent spectrum is free inclusive of guard bands. For example, as shown in FIG. 3, an optical modem can be resized from 10G to 40G to 100G using additional spectrum, baud rate changes, modulation format adjustments, etc.

Network Responsiveness

The systems and methods described herein focus on the Network Responsiveness exhibiting statistical behavior in ODUflex capable OTN Networks and Flex Grid DWDM networks, thus improving on network utilization. Conventionally, TDM (SONET/OTN/DWDM) networks functions cannot adapt to demand uncertainties and thus there exists no "Over-subscription." Currently OTN/DWDM connections behave as "ODUflex (CBR)/Fixed Grid spectrum" and setup is done for "High Order (HO)/Low Order (LO) ODUk Connection Termination Points (CTPs)/Spectrum based on modem baud rates". This allocates fixed bandwidth in the network as well as on the drop ports. In the systems and methods described herein, instead, ODUflex/Flex Grid allows for varying traffic demands (specifically IP/MPLS/Ethernet) over period of time, to resize and use the network bandwidth efficiently, both in the network as well as drop ports. This brings in the concept of "Statistical Multiplexing" into the traditional OTN/DWDM networks, which are basically "Non-statistical" in nature. The nature of statistical multiplexing allows for "Over-subscription" of network resources (NNI/UNI interfaces).

In order to adapt to statistical nature of demand uncertainty, one needs to tackle the following issues: When and how much to Resize/Reallocate? What is the cost involved: Hitless vs Non-Hitless? What is the CoS (Class of Service) precedence? Eventually all the above questions relate to "Can the network be made adaptable to Network dynamics, either in a Control Plane or Software Defined Networking (SDN) Applications?" The current network functions are purely based on Static allocation of CBR or Peak Rates. There are no routing criterion except for, either routing to avoid the links, which have already allocated Peak rates or simply ignoring Peak rates leading to contention of TS/spectrum during resize. Also there is no built in feedback mechanism in TDM networks, to help answer the abovementioned questions. Statistical data can be used to answer the abovementioned questions. Thus, the systems and methods define parameters/profiles for transport networks (OTN/DWDM) to handle statistical multiplexing.

Statistical Multiplexing

The systems and methods start with the real time statistical modeling based on the following factors 1. Demand uncertainties, 2. Over-subscription, and 3. Early congestion detection. This involves the network elements and Transport Control Plane Functions to do the basic operation of sampling the bandwidth usage on UNI and NNI links over time. This can be then used to feed into either the control plane or SDN applications, as a feedback mechanism to trigger various operations like resize, reallocate, optimize, etc. This makes the network adaptable to the statistical behavior of abovementioned three factors. The behavior is modelled around the following central idea: I. UNI Ports profiling helps detect congestion on the input ports and initiate resize operation in the OTN/DWDM network a-priori. This is based on an adaptive prediction algorithm based on peak rate variance (ADPV); and II. Routing functions adapt to these profiles on NNI ports based on MAX-FLOW routing criterion, instead of standard cumulative cost function.

Summarized Proposed Optimization Functions

ODUflex (GFP) can be used for "bursty/transactional/constant with smaller variations" traffic, it necessitates association of "bandwidth usage on links over period of time". Congestion/contention is minimized by utilizing WHWMD (Weighted High Water Mark Detect) profile on links. This profile can associate the flexible bandwidth usage on links to services. This profile could be associated with either UNI or NNI ports. On UNI ports, ODUflex CTP sourcing OPUflex payload can be monitored for two aspects as part of profiling: a. Class of service (CoS): based on priority in case of congestion at drop ports; and b. De-bounce the incoming demand fluctuations so as to minimize resize and reallocations on the ODU-Flex connection. A slight increase in incoming signal rate can cross ODU0 TS boundary. For this we use a parameter (Differential Peak Variance (DPV): defined per connection as the peak variance) to avoid resizing operations. This prevents frequent reallocation/resizing if the incoming traffic does not deviate much from its lower to upper bounds. Priority-based resizing can be initiated based on WHWMD congestion detection. Also, reallocations can be minimized when the resizing (increase) is required, since it will not be hitless.

Intuitive Routing Advertisements/Additions

Intuitively based on background description, the basic assumption is G.HAO capable links are advertised in the control plane, since only those links can be used for resizing. Second assumption is the basic additions to the routing advertisements on a link include compliance as explained in Generalized Multi-Protocol Label Switching (GMPLS) Signaling Extensions for the evolving G.709 Optical Transport Networks Control, September 2013, available online at tools.ietf.org/html/draft-ietf-ccamp-gmpls-signaling-g709v3-12.

Bandwidth Usage on Links Over a Period of Time

The systems and methods define the following parameters:

| PARAMETER | PORT | Definition |
|---|---|---|
| HWM (Max/Min) | NNI, UNI | High Water Mark (Absolute/Average) |
| LWM | NNI, UNI | MIN {HWM} = Average/Absolute LWM (Low Water Mark) |
| $\Delta_{ov}$ | NNI | Oversubscription |
| $TH_{MIN}$ and $TH_{MAX}$ | NNI, UNI | Minimum and Maximum thresholds (#TimeSlots) |
| CD | NNI, UNI | (Connection Discourage) criterion for each SVC Class: NONE/RANDOM/DROP/ PERCENTAGE = MPD (Mark Probability Denominator) |
| HWMDP | NNI | HWM Drop Profile Linear/Exponential |
| DPV | UNI | Differential Peak Variance |

The CD and $TH_{MIN}$ and $TH_{MAX}$ (#TimeSlots) can be user-provisioned whereas the HWM, LWM and $\Delta_{ov}$ are run time parameters.

Figure 4:
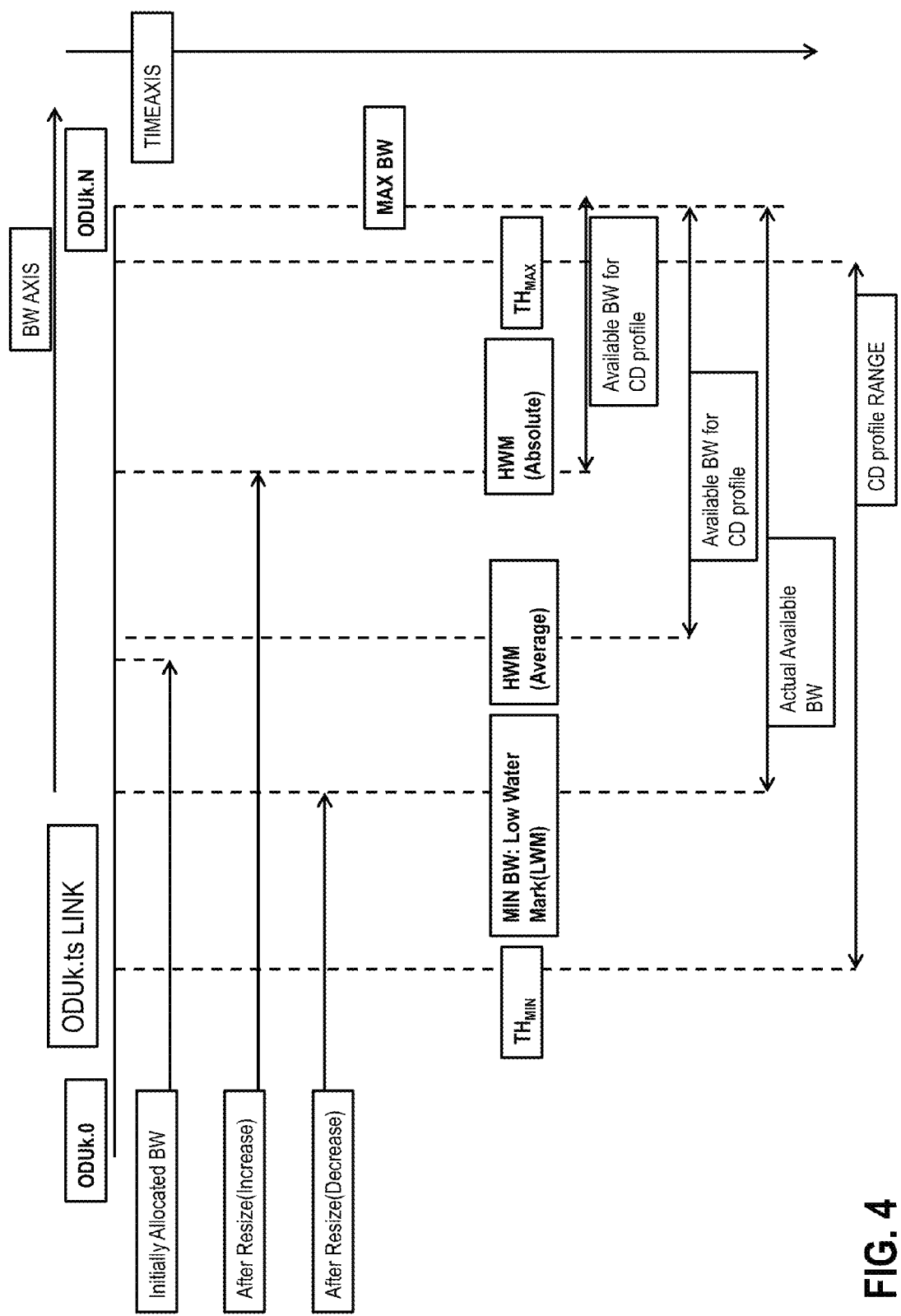
FIG. 4 is a graph of the various aforementioned parameters on an ODUk bandwidth (ODU0 TS) scale.

Referring to FIG. 4, in an exemplary embodiment, a graph illustrates the various aforementioned parameters on an ODUk bandwidth (ODU0 TS) scale for a connection. The graph include bandwidth on an x-axis and time on a y-axis. The connection has a CD profile range $TH_{MIN}$ to $TH_{MAX}$, a Low Water Mark (LWM)—minimum bandwidth, a HWM (average), and HWM (absolute). The overall bandwidth ranges from ODUk.0 to ODUk.N. Initially, the connection has an initially allocated bandwidth which is increased after a resize and decrease after another resize.

Figure 5:
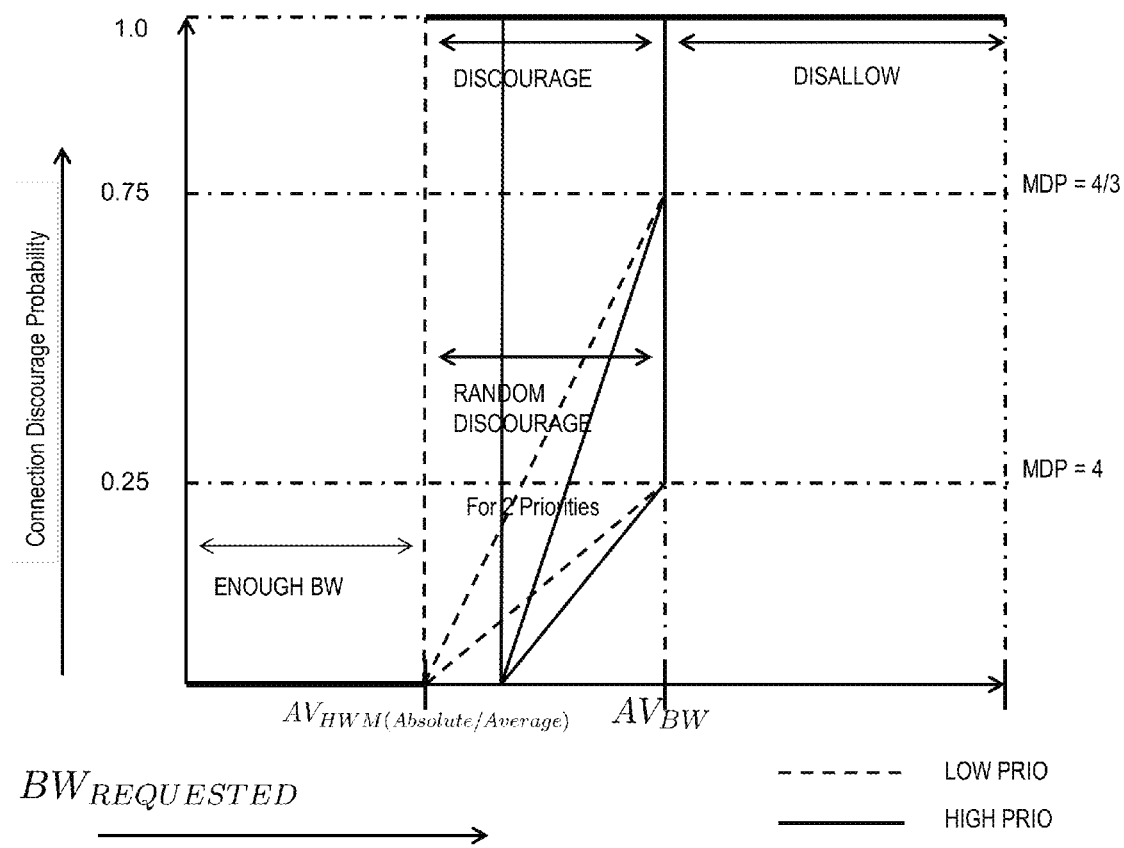
FIG. 5 is a graph of a WHWMD profile for NNI/UNI ports.
Figure 6:
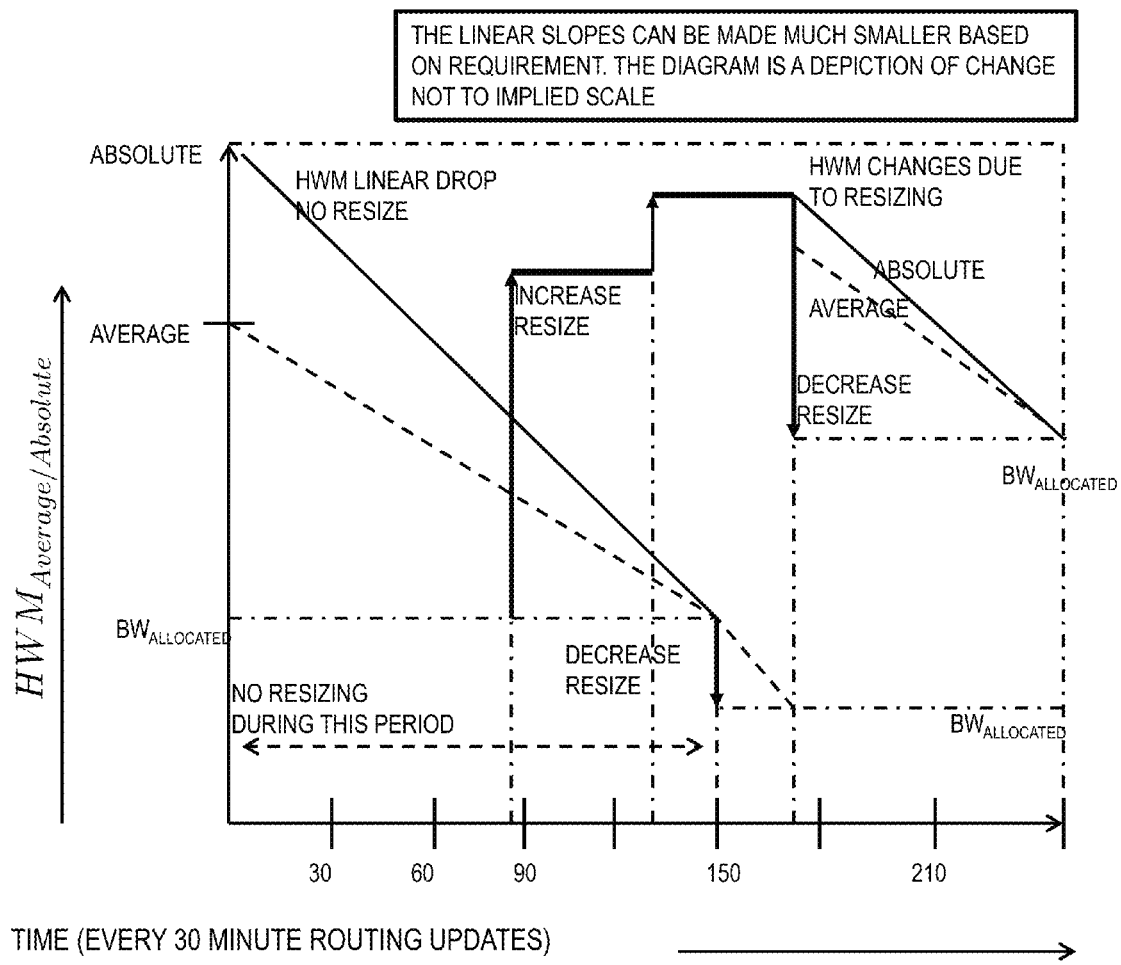
FIG. 6 is a graph of HWM drop profiles for NNI ports.

Referring to FIG. 5, in an exemplary embodiment, a graph illustrates a WHWMD profile for NNI/UNI ports. Referring to FIG. 6, in an exemplary embodiment, a graph illustrates HWM drop profiles for NNI ports.

Sampling Function

Total bandwidth usage on a UNI/NNI port can be taken periodically. These samples are limited to e.g. 100 samples and the statistical parameters like average/variance are measured for the same. The time scale of samples for HWM are based on 1. User defined time scale; 2. The DPV sampling rate should be at-least double of the user specified time scale; and 3. The sampling rate could be made adaptable based on the detection of slope overload condition.

UNI Port DPV

First, DPV is defined as the differential peak variance in number of ODU0 TS# (granularity). This is the variance of ingress traffic on the source ODUflex drop port. This variance keeps track of the fluctuations in the ingress traffic. This is used for "Sensitivity to bursts of packets on ingress ports." DPV can be defined as:

$$DPV = \begin{cases} \dfrac{\sum_{k=1}^{N_{samples}} p_i * (HWM_{absolute} - HWM_{average})^2}{N_{samples}} & : \text{Average } DPV \\ \dfrac{\sum_{k=1}^{N_{samples}} p_i * (HWM_{MAX} - HWM_{MIN})^2}{N_{samples}} & : \text{Worst case } DPV \end{cases}$$

where $p_i$ is ($0 \leq p_i \leq 1$) is based on CoS (Class of Service). The above-mentioned parameter is used to trigger resizing/reallocation actions a-priori. This could be used to increase/decrease the network allocated bandwidth based on early detection of congestion on the input drop port. Simulation for the above ADPV (Adaptive Differential Peak Variance) are provided as follows.

NNI Parameter Definitions

HWM defines the absolute/average maximum bandwidth used on a link. This is calculated either as: i. MAX BW used by existing ODU-Flex connections on a link in previous N samples; and ii. Average value used by existing ODU-Flex connections on a link in previous N samples (e.g. 200 samples spread across 24/72 hours). Usually WHWMD profile formula can be used:

$HWM_{average} = (1-w) * HWM_{average} + w * BW_{used-sample}$

But not restricted to it, e.g. for 15*(2 minute) Bins over 30 minutes, $$HWM_{average} = \frac{\sum_{k=1}^{15} BW_{used-k-sample} * 2}{30}$$

or the Absolute value as:

$HWM_{absolute} = MAX\{BW_{used-sample}\}$ for last 24/72 ... hours

Minimum and Maximum thresholds $TH_{MIN}$ and $TH_{MAX}$ (#TimeSlots) are defined as the limits within which the CD (Connection Drop) criterion applies. HWM Drop Profile (HWMDP) signifies the profile by which the HWM value reduces over the last routing update period of 30 minutes if no changes are seen on the link.

CD (Connection Discourage) criterion applies during path computation to decide whether to disallow a connection on the link if the requested bandwidth is greater than the $(BW_{MAX} - HWM_{24/72})$. CD profile is applied only if $(BW_{MAX} - HWM)$ is within $TH_{MIN}$ and $TH_{MAX}$.

$BW_{REQUESTED} < \{LINKBW_{MAX} - HWM_{Average/Absolute}\}$:ALLOW Connection $BW_{REQUESTED} >= \{LINKBW_{MAX} - HWM_{Average/Absolute}\}$:APPLY CD profile The CD profile can either be NONE: No effect; DROP: Always Discourage; RANDOM DROP: Discourage the route randomly during path computation; or MPD: 1/{MPD} % times Discourage the route $\Delta_{ov}$ (Oversubscription) is the oversubscribed bandwidth on links based on HWM for ODUflex (GFP), thus MAX $\{\Delta_{ov}\}$ over all the links on a path is used as cost criterion during path computation. Since the weakest link (highest oversubscribed) in the path restricts resizing. Hence it is not an additive cost over the links but uses the Max-flow principle.

NNI/UNI Profiles and Oversubscription

WHWMD (Weighted High Water Mark Detect) Profiles are defined for ODUFlex capability (see FIG. 5). FIG. 5 illustrates a graph of bandwidth requested versus connection discourage (CD) probability. Discourage profiles control the behavior of a set of ingress UNI ports or the egress NNI links. Congestion is detected based on OTN Link bandwidth usage in terms of ODU0 TS#. This defines the range within the link bandwidth where WHWMD operates, the maximum percentage of links to be discouraged during routing function based on above-mentioned oversubscription ($\Delta_{ov}$). The routing function is listed later, it is not based on cumulative cost, instead based on Max-flow based routine. By default, dropping occurs when the requested data is oversubscribed and all incoming flows are at their peak rates. Thus these drop profiles allow to employ adaptive bandwidth management by specifying/WHWMD parameters for different CoS and trigger downsizing of lower priority traffic. This again can be initiated a-priori before max peak rate of the port is hit.

Routing Criterion

MAX$\{\Delta_{ov}\}$ over all the links on a path is used as cost criterion during path computation. Since the weakest link (highest oversubscribed) in the path restricts resizing. Hence it is not an additive cost over the links but uses the Max-flow principle. For example, if there are three paths with Path #1: $\Delta_{ov} = \{4,1,1\}$, MAX$\{\Delta_{ov}\} = 4$; Path #2: $\Delta_{ov} = \{3,3,1\}$, MAX$\{\Delta_{ov}\} = 3$, Next MAX$\{\Delta_{ov}\} = 3$; Path #2: $\Delta_{ov} = \{3,2,2\}$, MAX$\{\Delta_{ov}\} = 3$, Next MAX$\{\Delta_{ov}\} = 2$. Either the second or third is preferred over the first. If it were a cumulative sum, the first path would be preferred, which would be a bad choice if the connection was to resize. In case of tiebreaker (Both second and third paths have max value of MAX $\{\Delta_{ov}\} = 3$), one can use the next max value and so on and so forth. Thus as given in the example, there is a tie between the second and third paths, and the third is chosen, since the next max value is 2 for third path.

DWDM Resizing

In DWDM Networks all the before-mentioned parameters are based on Adjacent Free Spectrum in the Flex Grid. As an example in the FIG. 2, the adjacent free spectrum for first two channels can accommodate to 40/100G of bandwidth on resize, whereas the fourth channel cannot. The third channel can go from 40G to 100G. This data forms the basis of route calculation in case resize is required. This is different from OTN domain, since the TS can be non-contiguous and allocated in any order. In DWDM, the channel width and spacing on either side forms the contiguity constraint not only on a link (spectral dimension) but also all along the route (spatial dimension). Thus a 2-D constraint gets more involved in DWDM, worse than RWA in Fixed-Grid networks. If either resize of spectrum or Baud rate cannot be increased, routing function allocates a different path. The MAX$\{\Delta_{ov}\}$ is used in a similar manner as OTN for routing a new connection in the DWDM network.

$$\Delta_{OV} = \begin{cases} HWM_{Average/Absolute} + \{BW_{REQ}\} - LINKBW_{max} & : HighPrio \text{ or Low Ingress } Traff \\ HWM_{Average/Absolute} + MAX\{BW_{REQ}\} - LINKBW_{max} & : LowPrio \text{ or High Ingress } Traff \end{cases}$$

WHWMD Profile for NNI/UNI Ports

In FIG. 5, the graph provides the WHWMD profile on NNI links. The Available bandwidth is calculated based on the HWM samples collected over past N samples. This could be either absolute (e.g., max of previous 100 samples) or a nominal average of the same. The previous 100 samples could span on the time scale to 24-72 hours or a week. The High priority connections calculate the oversubscription cost later than to that of low priority connections. The randomization window in the graph is to provide the routing function to use $\Delta_{ov}$ to a random percentage. If no randomization is configured, the routing function always or never uses the $\Delta_{ov}$ value based on the profile. The disallow window is simply stating that bandwidth is not available.

Path Validation—Min $\Delta_{ov}$ Based

Figure 7:
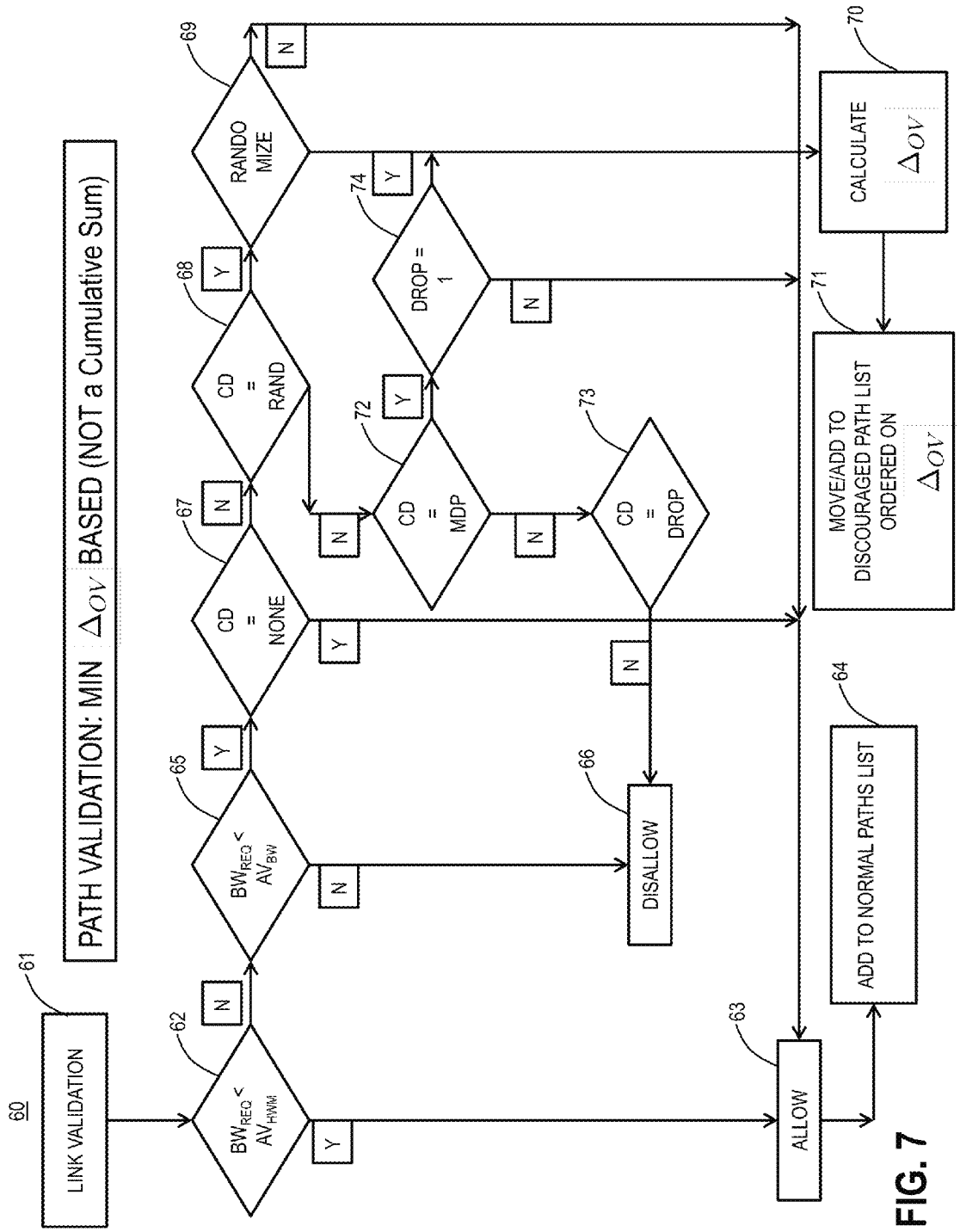
FIG. 7 is a flowchart of a path validation method 60 based on min $\Delta_{ov}$ (not on a cumulative sum)

Referring to FIG. 7, in an exemplary embodiment, a flowchart illustrates a path validation method 60 based on min $\Delta_{ov}$ (not on a cumulative sum). The path validation method 60 is based on the above WHWMD profile. First, link validation occurs 61, the path validation method 60 checks if the required bandwidth, $BW_{REQ}$, is less than the average HWM, $AV_{HWM}$ (step 62), and if so, the path validation method 60 allows the bandwidth on the link (step 63) and adds it to a normal paths list (step 64). If $BW_{REQ}$ is not less than $AV_{HWM}$ (step 62), then the path validation method 60 checks if the $BW_{REQ}$ is less than the average bandwidth, $AV_{BW}$ (step 65), and if not, the path validation method 60 disallows the bandwidth (step 66). If the $BW_{REQ}$ is less $AV_{BW}$ (step 65), the path validation method 60 checks if the connection discourage (CD) is set to none (step 67), and if so, the path validation method 60 allows the bandwidth on the link (step 63). If not (step 67), the path validation method 60 checks if the CD is set to random (step 68).

If the CD is set to random (step 68), the path validation method 60 checks if the profile is set to randomize (step 69), and if not, the path validation method 60 allows the bandwidth on the link (step 63). If the profile is set to randomize (step 69), the path validation method 60 calculates $\Delta_{ov}$ (step 70) and moves/adds the path to a discouraged path list ordered on min $\Delta_{ov}$ (step 71). If the CD is not set to random (step 68), the path validation method 60 checks if the CD is equal to Mark Drop Profile (MDP) (step 72), and if not, the path validation method 60 checks if the CD is set to drop (step 73) and disallows (step 66). If the CD is equal to the MDP (step 72), the path validation method 60 checks if drop is set to 1, and if not, the path validation method 60 allows (step 63), and if so, the path validation method 60 calculates $\Delta_{ov}$ (step 70).

HWM Drop Profile

FIG. 6 is the graph providing the drop profile for HWM in case there is no change in the bandwidth of the link over a period of time (e.g. 30 minutes). In this case the HWM drops per flooding updates. This is done so as to indicate that the link is no more hitting the peak values. If average value of HWM was to be used instead of absolute this value will automatically reduce over period of time as a step function. Thus for absolute HWM values, the flooded updates will reduce the same based on a slope factor (defaulted to 1 per N samples).

HWM is flooded per Priority of service for a link. The typical usage of link bandwidth over time is known to all network elements. Thus based on HWM values for all links along the path of a low priority connection, a source can decide to move away rather than resize to increase. Since a mesh of smaller size will be better than mesh of larger pipes towards client services. Multiple CD profiles can be associated with a link, each associated to the type of traffic being carried within the ODUflex. During a resize, CD profile can be used to trigger mesh of other connections on a link. The WHWMD profiles associated with the drop ports can be assigned to the connections as well, instead of links. This will make each connection react to resize operations differently. If HWM is triggered due to different connections, source nodes are provided with the explicit feedback of possible contention over a link, since each node knows if HWM increased and they did not do a resize. HWM information can be used by an SDN controller to optimize the network connections in the network, e.g., Network optimization/load balancing via re-grooming based on HWM values. The difference (HWM–LWM) can be used to indicate variance of actual traffic on links in the network.

Routing Updates for HWM

Figure 8:
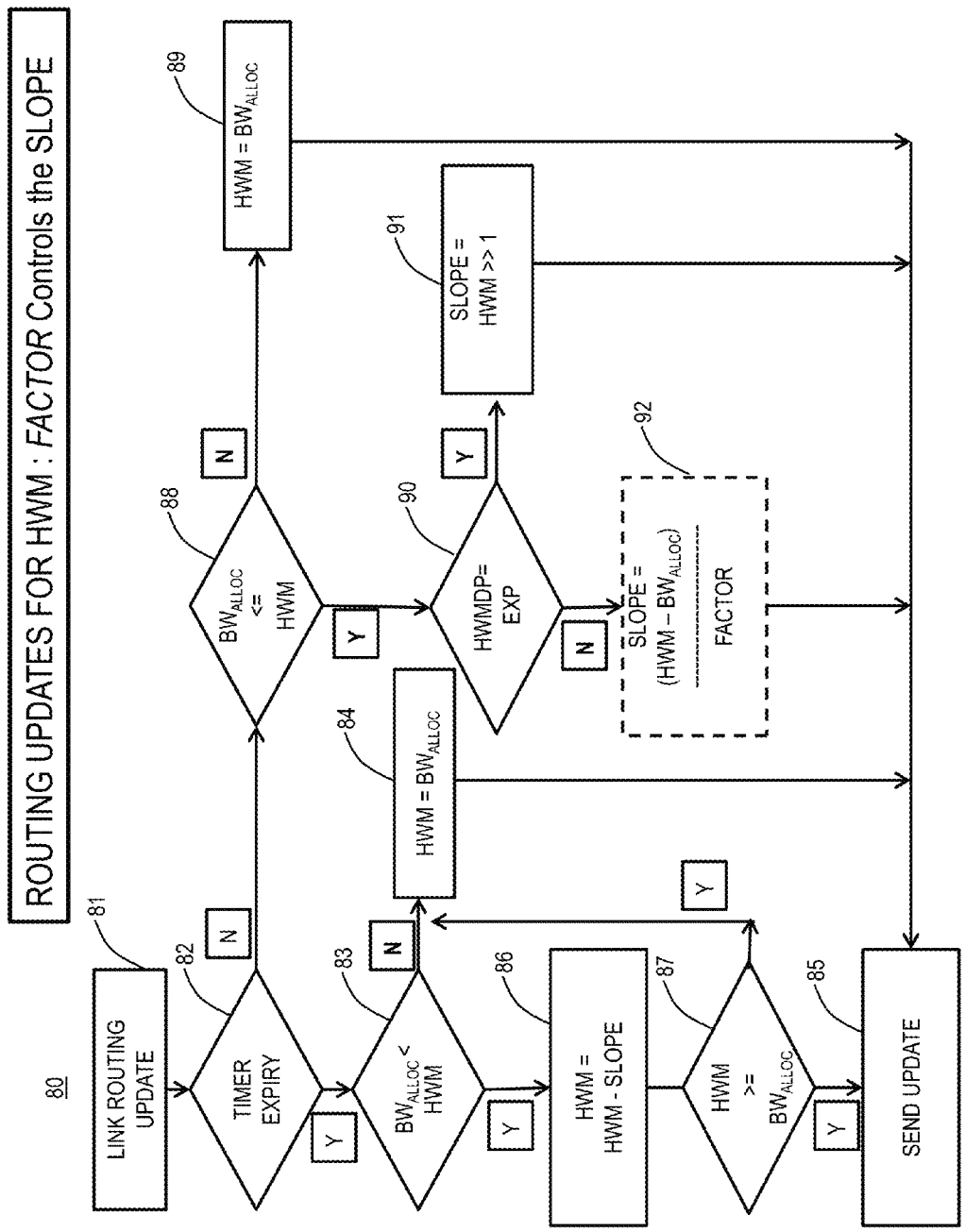
FIG. 8 is a flowchart of a routing updates for HWM method.

Referring to FIG. 8, in an exemplary embodiment, a flowchart illustrates a routing updates for HWM method 80. The method 80 is for the HWMDP (Drop profile for HWM). The method 80 includes a link routing update (step 81) and checks if a time has expired (step 82). If so, the method 80 checks if allocated bandwidth, $BW_{ALLOC}$, is less than the HWM (step 83), and if not, the HWM is set to the $BW_{ALLOC}$ (step 84) and an update is sent (step 85). If $BW_{ALLOC}$ is not less than the HWM (step 83), the HWM is set to the HWM minus a slope (step 86). The method 80 checks if the HWM is greater than or equal to the $BW_{ALLOC}$ (step 87), and if so, the method 80 sets the HWM equal to the $BW_{ALLOC}$ (step 84). If not, the method 80 sends the update (step 85).

If the timer has not expired, the method 80 checks if the $BW_{ALLOC}$ is less than or equal to the HWM (step 88), and if not, the HWM is set to the $BW_{ALLOC}$ (step 89) and the method 80 sends the update (step 85). If the $BW_{ALLOC}$ is not less than or equal to the HWM (step 88), the method 80 checks if the HWMDP equals EXP (step 90), and if so the slope is set to the HWM which is much greater than one (step 91). If the HWMDP does not equal EXP (step 90), the slope is set to (HWM–$BW_{ALLOC}$)/factor (step 92), and the method 80 sends the update (step 85).

UNI ADPV (Adaptive Differential Peak Variance) Algorithm Simulation

The following descriptions detail the three aspects for different ingress traffic fluctuations—bursty, constant with minor fluctuations, and transactional.

Figure 9:
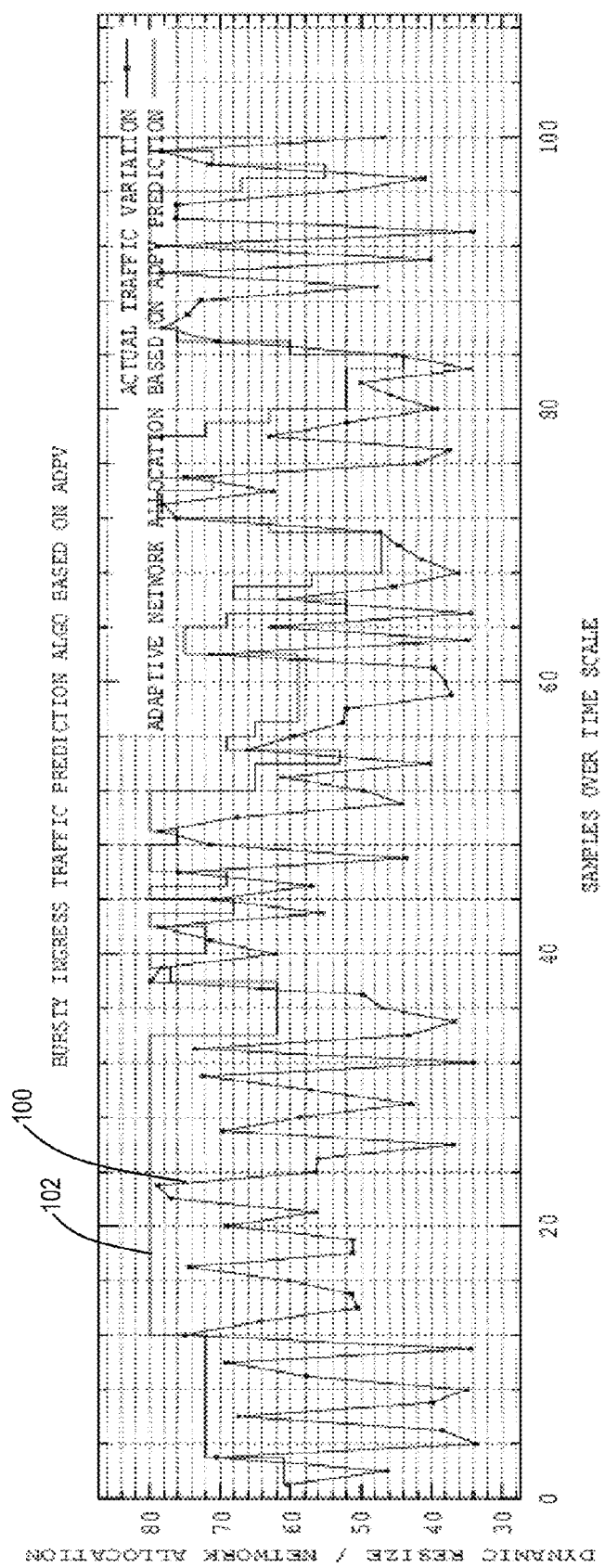
FIG. 9 is a graph of a simulation of bursty traffic.

Referring to FIG. 9, in an exemplary embodiment, a graph illustrates a simulation of bursty traffic with a line 100 illustrating 100 random samples for HWM (MAX and MIN). A line 102 is the prediction based on statistical sampling with Adaptable step size. At the start, a random step size is provided, but over the period of time the step size becomes a function of standard deviation of peak-peak variance of the actual bursty traffic. This is the worst case for any system. The de-bouncing is applied only for a drop of less than 2 ODU0 TS. The algorithm detects a positive (+) slope and resizes the connection with a step size based on standard deviation of peak-peak variance of last 100 samples. On detecting a negative (−) slope it reduces with a step size (after applying debouncing) of actual traffic load after waiting for the HWM sample period, since this will not cause a traffic hit.

Figure 10:
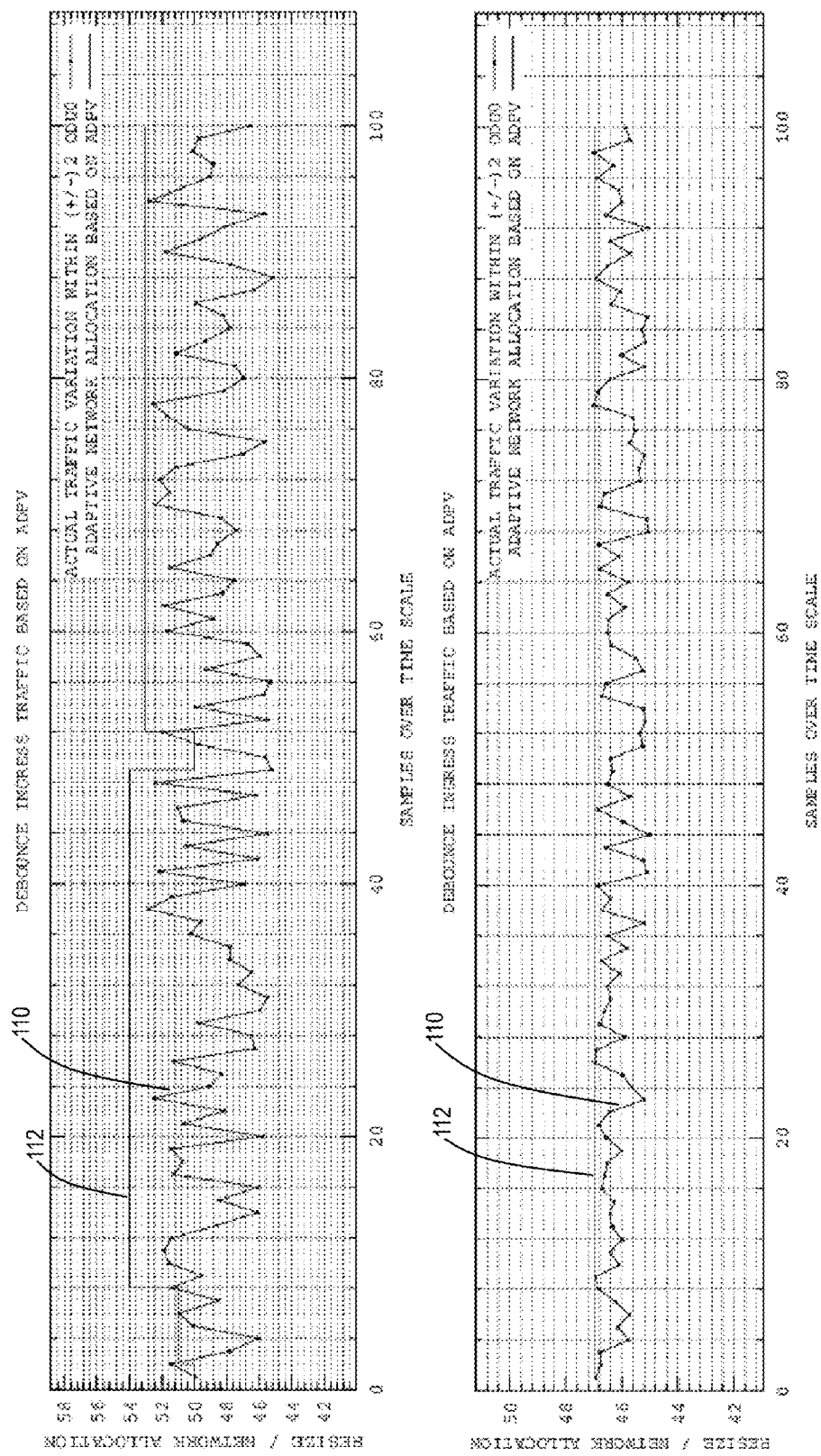
FIG. 10 is a graph of a simulation of constant traffic.

Referring to FIG. 10, in an exemplary embodiment, a graph illustrates a simulation of constant traffic with minor fluctuations with a line 110 illustrating 100 random samples for HWM (MAX and MIN). A line 112 is the prediction based on statistical sampling with adaptable step size. At the start a random step size was provided. The de-bouncing is applied for an increase or drop of less than 2 ODU0 TS. The algorithm detects a positive (+) slope and resizes the connection with a step size based on standard deviation of peak-peak variance of last 100 samples. Thus the abovementioned DPV can be used to de-bounce the ingress traffic fluctuations. This avoids the triggers to un-necessary resizing operations of (1 or 2) ODU0 TS in the network in case the ingress traffic is crossing the ODU0 TS boundaries in terms of ingress signal rates. The decisions can be based on the limits of variance, e.g. for HO ODU2 Flex connections the variance fluctuation limits for de-bouncing could be 1, 2 ODU0 TS, whereas for HO ODU3, 4 Flex connections it could be ranging from 4 to 8 ODU0 TS.

Figure 11:
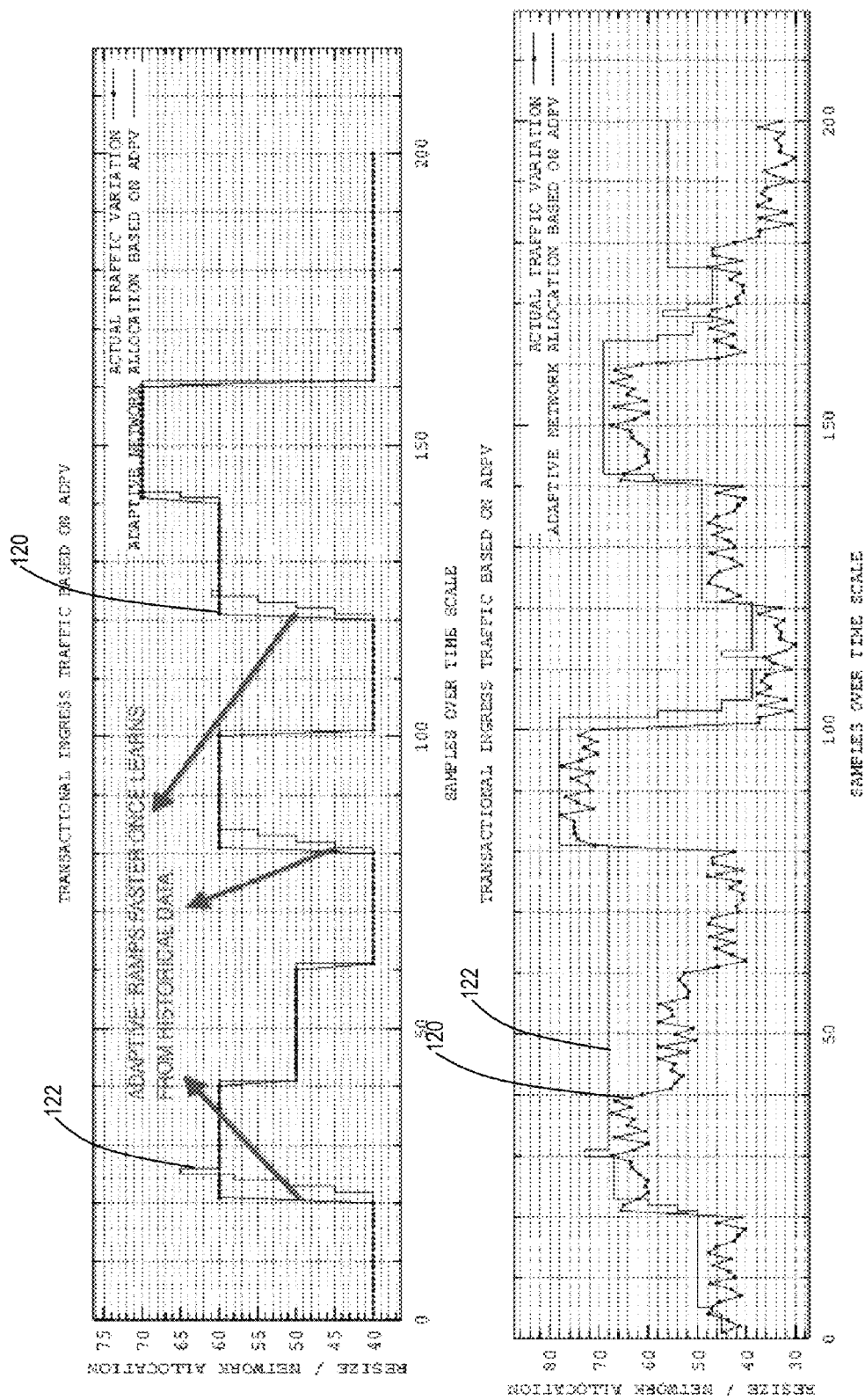
FIG. 11 is a graph of a simulation of transactional traffic.

Referring to FIG. 11, in an exemplary embodiment, a graph illustrates a simulation of transactional traffic with a line 120 illustrating 200 random samples for HWM (MAX and MIN). A line 122 is the prediction based on statistical sampling with adaptable step size. At the start a random step size of "0" was provided. As one can notice in the figure the first time the prediction takes longer to step increase for resize, whereas later it adapts and hits the resize much sooner. Secondly the second step size is larger than first one, indicative of adaptive nature of the same. The algorithm detects a positive (+) slope and resizes the connection with a step size based on standard deviation of peak-peak variance of last 100 samples. Thus the abovementioned DPV can be used to resize transactional traffic fluctuations.

The abovementioned cases depict the adaptive nature of network for demand uncertainties and early congestion detection. The same HWM samples are collected on NNI ports as well to estimate the oversubscription. Similarly the DWDM network ingress client port can apply this profile and achieve exactly the same functionality as well initiate a request to DWDM L0 to trigger a resize a-priori or reallocate if required.

Exemplary Network Element

Figure 12:
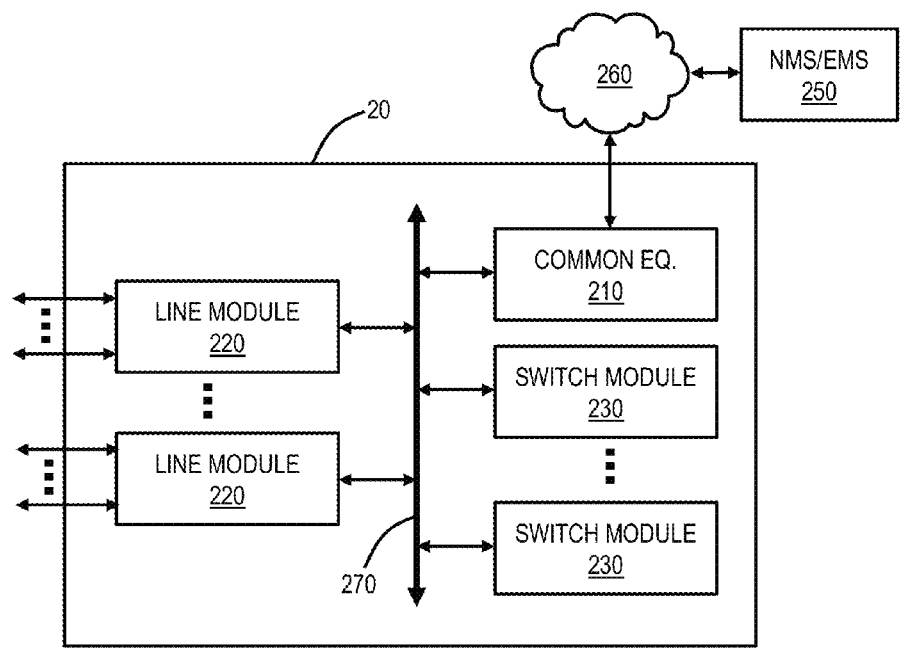
FIG. 12 is a block diagram of an exemplary network element for use with the systems and methods described herein.

Referring to FIG. 12, in an exemplary embodiment, a block diagram illustrates an exemplary network element 20 for use with the systems and methods described herein. In an exemplary embodiment, the exemplary network element 20 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the network element 20 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 20 can be any digital system with ingress and egress digital signals and switching therebetween of channels, timeslots, tributary units, etc. While the network element 20 is generally shown as an optical network element, the systems and methods contemplated for use with any switching fabric, network element, or network based thereon.

In an exemplary embodiment, the network element 20 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 12, configured to operate the control plane as described herein. The network element 20 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links to/from the network element 20. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 220 can include wavelength division multiplexing interfaces, short reach interfaces, and the like, and can connect to other line modules 220 on remote network elements, end clients, edge routers, and the like, e.g. forming connections on the links. From a logical perspective, the line modules 220 provide ingress and egress ports to the network element 20, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the network element 20 can include other components which are omitted for illustration purposes, and that the systems and methods described herein are contemplated for use with a plurality of different network elements with the network element 20 presented as an exemplary type of network element. For example, in another exemplary embodiment, the network element 20 may not include the switch modules 230, but rather have the corresponding functionality in the line modules 220 (or some equivalent) in a distributed fashion. For the network element 20, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the network element 20 is merely presented as one exemplary network element 20 for the systems and methods described herein.

Exemplary Controller

Figure 13:
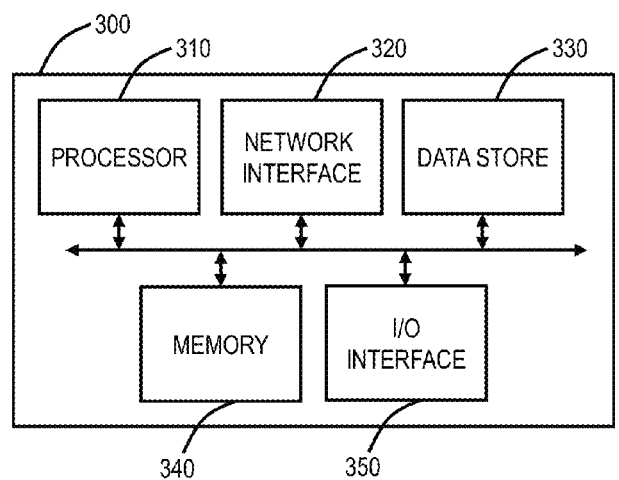
FIG. 13 is a block diagram of a controller to provide control plane processing and/or operations, administration, maintenance, and provisioning (OAM&P) for the network element of FIG. 12.

Referring to FIG. 13, in an exemplary embodiment, a block diagram illustrates a controller 300 to provide control plane processing and/or operations, administration, maintenance, and provisioning (OAM&P) for the network element 20. The controller 300 can be part of common equipment, such as common equipment 210 in the network element 20, or a stand-alone device communicatively coupled to the network element 20 via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an I/O interface 350, and the like, all of which are communicatively coupled therebetween and with the processor 310.

The network interface 320 can be used to enable the controller 300 to communicate on the DCN 160, such as to communicate control plane information to other controllers, to the management system 150, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 10 to operate the control plane for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane in the network 10. That is, the controller 300 is configured to implement software, processes, algorithms, etc. that control configurable features of the network 100, such as automating discovery of the network elements 20, capacity on the links, port availability on the network elements 20, connectivity between ports; dissemination of topology and bandwidth information between the network elements 20; path computation and creation for connections; network level protection and restoration; and the like. As part of these functions, the controller 300 can include a topology database that maintains the current topology of the network 10 based on control plane signaling (e.g., HELLO messages) and a connection database that maintains available bandwidth on the links again based on the control plane signaling. Again, the control plane is a distributed control plane; thus a plurality of the controllers 300 can act together to operate the control plane using the control plane signaling to maintain database synchronization. In source-based routing, the controller 300 at a source node for a connection is responsible for path computation and establishing by signaling other controllers 300 in the network 10. For example, the source node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes network elements 20 from the originating node to the destination node based on a plurality of constraints such as administrative weights on the links, bandwidth availability on the links, etc.

Multi-Layer Integration

UNI Port profiling helps in detecting congestion on the input ports to initiate resize operation in the OTN/DWDM network a-priori. Routing functions adapt to these profiles on NNI ports based on Max-flow routing criterion, instead of standard cumulative cost function.

Communications network technologies and solutions are evolving as multi-layer entities. The systems and methods described herein provide techniques to integrate IP/MPLS/ETH⇔OTN or OTN⇔DWDM or IP/MPLS/ETH⇔DWDM. The enabling technologies in the current research or industry areas are: IP/MPLS/ETH⇔OTN: ODU-Flex G.HAO; OTN⇔DWDM: FLEX GRID SPECTRUM with signal rate adaptable Transponders; and IP/MPLS/ETH⇔DWDM: OPTICAL BURST SWITCHING.

IP/MPLS/ETH⇔OTN or POTS provides schemes to act on Packet-OTN interconnections. The idea of demand uncertainties with statistical multiplexing relieves the operator from reconfiguring the network on a periodic basis. Instead the network itself is adaptable. Secondly with evolution of SDN (Which is also a big data mining machine), the feedback from the network based on abovementioned schemes is far more relevant that just distributed control plane routing functions.

OTN-DWDM/PACKET-DWDM integration (FLEX GRID): The above-mentioned schemes can be adapted to OTN-DWDM interconnections as well, where the Ingress wavelength in the DWDM network can be resized based on flex-grid model dynamically. The enabling technologies can be used to resize the spectrum in a flex-grid domain. The above-mentioned concepts of statistical multiplexing can be used to achieve hitless resizing in the DWDM world. The only change will be a change from ODU0 TS to spectrum usage based on MODEM schemes. The mapping incorporated into the before-mentioned concepts is given as follows—ODU0 TS#⇔6.25 GHz BW; G.HAO⇔Spectrum resizing based on Flex grid through a change in baud rate or an increase in bandwidth on same baud rate; INGRESS Profiling in multi-layer domain: a) Gbps⇔ODU0 TS⇔6.25 GHz granularity spectrum usage DWDM (IP/MPLS/ETH over OTN over DWDM) and b) Gbps⇔6.25 GHz granularity spectrum usage DWDM (IP/MPLS over DWDM); and a decision to install new wavelength or not based on ingress traffic profiling. The network intelligence along with SDN applications can even help the network operator to define the uncertain demand profiles over a period of time.

The HWM is flooded per Priority of service for a link—Typical usage of link bandwidth over time is known to all nodes. Thus based on HWM values for all links along the path of a low priority connection a source can decide to move away rather than resize to increase. Since a mesh of smaller size will be better than mesh of larger pipes towards client services. Multiple CD profiles can be associated with a link, each associated to the type of traffic being carried within the ODUflex. During a resize, the CD profile can be used to trigger mesh of other connections on a link. The WHWMD profiles associated with the drop ports can be assigned to the connections as well, instead of links. This will make each connection react to resize operations differently. If HWM is triggered due to different connections, source nodes are provided with the explicit feedback of possible contention over a link, since each node knows if HWM increased and they did not do a resize. The HWM information can be used by SDN controller to optimize the network connections in the network, e.g., Network optimization/load balancing via re-grooming based on HWM values. The difference (HWM−LWM) can be used to indicate variance of actual traffic on links in the Network. This provides data to data mining applications within SDN controller to do better job in optimization and network planning.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element in a network comprising a plurality of network elements interconnected to one another by one or more links with Layer 1 Optical Transport Network (OTN) bandwidth, the network element comprising:
at least one port providing Optical channel Data Unit flex (ODUflex) connections in a network; and
a controller communicatively coupled to the at least one port, wherein the controller is configured to
define a plurality of statistical parameters to determine whether to resize Optical channel Data Unit flex (ODUflex) connections on user-network interface (UNI) ports and network-network interface (NNI) ports;
selectively sample bandwidth usage on the UNI ports and the NNI ports based on the defining;

profile the UNI ports with the ODUflex connections in the network based on the sample;

compute a maximum oversubscription on all links in the network for the profile; and adapt, using a max-flow routing criterion, the NNI ports with the ODUflex connections based on the profiling; and utilize the maximum oversubscription as a cost criterion during path computation in the network.

2. The network element of claim 1, wherein the controller is further configured to detect congestion on the UNI ports based on the profile and initiate a resize based thereon for associated ODUflex connections, wherein detection is based on an adaptive prediction algorithm based on peak rate variance.

3. The network element of claim 1, wherein the controller is further configured to resize an ODUflex connection based on the profile and the adapt, utilizing hitless adjustment of ODUflex (HAO).

4. The network element of claim 1, wherein the controller is further configured to monitor a differential peak variance in a number of ODU0 timeslots on the UNI ports based on the profile; and resize an ODUflex connection based on the monitor.

5. The network element of claim 1, wherein the controller is further configured to utilize Weighted High Water Mark Detect profiling on the UNI port and the NNI ports to minimize congestion/contention.

6. The network element of claim 1, wherein the controller is further configured to define an absolute and average maximum bandwidth used on a link for the profile; and define a connection discourage criterion to apply during path computation to decide whether to disallow a connection on the link if a requested bandwidth is greater than a threshold.

7. The network element of claim 1, wherein the controller is further configured to define an absolute and average maximum bandwidth used on a link for a High Water Mark (HWM) for the profile; and perform oversubscription on the link based on the absolute and average maximum bandwidth.

8. The network element of claim 1, wherein the controller is further configured to selectively sample bandwidth usage on the UNI ports and the NNI ports for the profile;

define a plurality of statistical parameters for using the sample to determine whether to resize ODUflex connections on the UNI ports and the NNI ports; and perform one of advertising the plurality of statistical parameters through a control plane or providing the plurality of statistical parameters to a Software Defined Networking (SDN) controller.

9. The network element of claim 1, wherein the controller is further configured to receive a request for additional bandwidth in the network on an ODUflex connection;

based on the profile, allow the request if the additional bandwidth is less than an average maximum bandwidth used on a link for a High Water Mark (HWM) or based on connection discourage criterion; and disallow the request if the additional bandwidth is greater than an average bandwidth on the link or based on the connection discourage criterion.

10. The network element of claim 1, wherein the controller is further configured to oversubscribe the ODUflex connections in the network based on the profile and the adapt.

11. A network element configured to communicate with one or more network elements interconnected to one another by one or more links in a network with Layer 1 Optical Transport Network (OTN) bandwidth, the network element comprising:

at least one port providing Optical channel Data Unit flex (ODUflex) connections in a network; and a controller communicatively coupled to the at least one port, wherein the controller is configured to:

profile user-network interface (UNI) ports with the ODUflex connections in the network;

adapt, using a max-flow routing criterion, network-network interface (NNI) ports with the ODUflex connections based on the profiling;

compute a maximum oversubscription on all links on the at least one port based on the profile of the UNI ports; and utilize the maximum oversubscription as a cost criterion during path computation.

12. The network element of claim 11, wherein the controller is further configured to:

cause a resizing of an ODUflex connection based on the profiling and the adapting utilizing hitless adjustment of ODUflex (HAO).

13. The network element of claim 11, wherein the controller is further configured to:

selectively sample bandwidth usage on the ODUflex connections on the at least one port to profile the UNI ports; and communicate the sampling in a control plane.

14. The network element of claim 11, wherein the controller is further configured to:

oversubscribe the ODUflex connections on the at least one port based on the profile and the adapt.

15. A network element in a network comprising a plurality of network elements interconnected to one another by one or more links with Layer 1 Optical Transport Network (OTN) bandwidth, the network element comprising:

at least one port providing Optical channel Data Unit flex (ODUflex) connections in a network; and a controller communicatively coupled to the at least one port, wherein the controller is configured to define an absolute and average maximum bandwidth used on a link for a High Water Mark (HWM);

profile user-network interface (UNI) ports with Optical channel Data Unit flex (ODUflex) connections in the network;

compute a maximum oversubscription on all links in the network for the profile;

adapt, using a max-flow routing criterion, network-network interface (NNI) ports with the ODUflex connections based on the profile; and perform oversubscription on the link in the adapt based on the absolute and average maximum bandwidth utilizing the maximum oversubscription as a cost criterion during path computation in the network.

16. The network element of claim 15, the controller is further configured to resize an ODUflex connection based on the profile and the adapt, utilizing hitless adjustment of ODUflex (HAO).

17. The network element of claim 15, wherein the controller is further configured to monitor a differential peak variance in a number of ODU0 timeslots on the UNI ports based on the profile; and resize an ODUflex connection based on the monitor.

18. The network element of claim 15, the controller is further configured to utilize Weighted High Water Mark Detect profiling on the UNI port and the NNI ports to minimize congestion/contention.

19. The network element of claim 15, wherein the controller is further configured to define an absolute and average maximum bandwidth used on a link for the profile; and define a connection discourage criterion to apply during path computation to decide whether to disallow a connection on the link if a requested bandwidth is greater than a threshold.

* * * * *